Jan. 6, 1959 W. P. LEAR 2,867,392
BOUNDARY LAYER CONTROL FOR AIRCRAFT
Filed Aug. 19, 1955
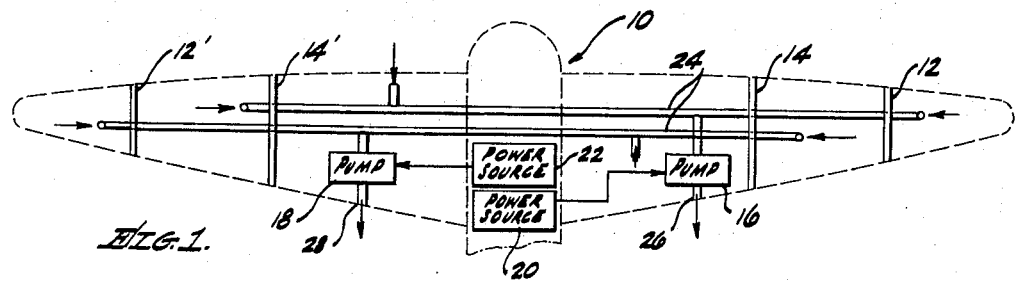
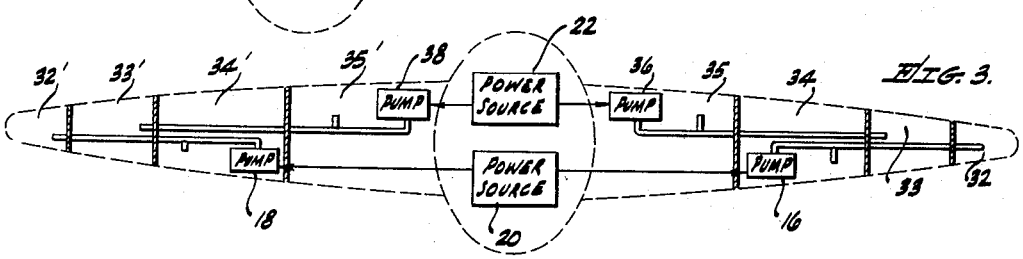
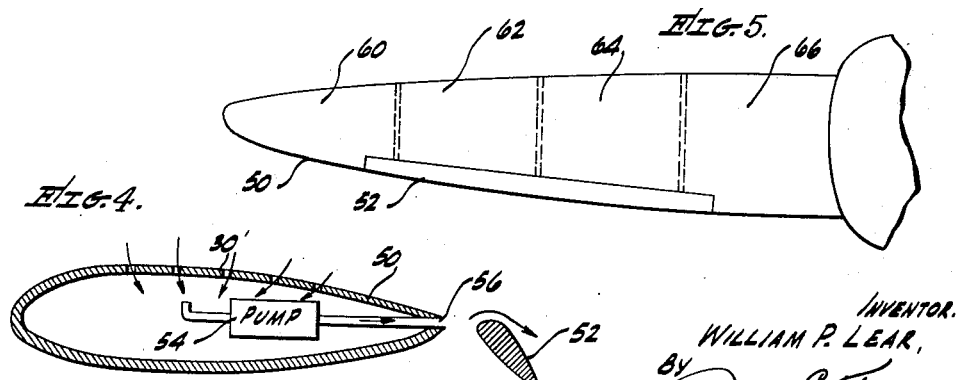
INVENTOR.
WILLIAM P. LEAR,
BY Perry E. Turner
AGENT.

United States Patent Office 2,867,392
Patented Jan. 6, 1959

2,867,392

BOUNDARY LAYER CONTROL FOR AIRCRAFT

William P. Lear, Pacific Palisades, Calif., assignor to Lear, Incorporated, Santa Monica, Calif.

Application August 19, 1955, Serial No. 529,530

1 Claim. (Cl. 244—42)

This invention relates to aircraft control, and more particularly to a method of and means for controlling boundary layers on aircraft.

As is well known, boundary layer control involves maintaining laminar flow of air passing over the wings and flaps of an aircraft to minimize friction drag and to avoid stalling. In another aspect, its objective is to minimize turbulent flow and separation of air on parts such as fuselages and deflected flaps. Studies in the field of boundary layer control illustrate the necessity for practical arrangements which will insure availability of control at all times and that the means for controlling the boundary layer be simple, light in weight and highly effective.

It is an object of this invention to provide a novel means for controlling the boundary layer adjacent surfaces of various parts of an aircraft to enhance the safety of flight.

It is another object of this invention to provide means to make boundary layer control readily available in an aircraft, which comprises a minimum number of component parts which are light in weight but of rugged construction.

It is still another object of this invention to provide means by which boundary layer control on corresponding parts of an aircraft can be maintained, whereby an unbalanced condition is avoided.

The above and other objects and advantages of this invention will become apparent from the following description taken in conjunction with the accompanying drawings, in which different embodiments of the invention are illustrated by way of example. The scope of the invention is pointed out in the appended claim. In the drawings, Fig. 1 is a schematic diagram of a system for controlling the boundary layer over the wing of an aircraft, Fig. 2 is a sectional view of the wing of an aircraft with provisions for boundary layer control in accordance with this invention, Fig. 3 is a schematic diagram of a modification of the system of Fig. 1, and Figs. 4 and 5 are respective section and plan views of a wing and flap to illustrate the use of this invention to prevent or delay turbulence of air passing over the flap.

Briefly, this invention comprises a pumping control system and method to effect sectionalized boundary layer control over a surface and by which loss of boundary layer control over a whole surface is obviated.

Referring to Figs. 1 and 2, an aircraft 10 has its wings divided into sections. As illustrated, the wings are divided into three sections or compartments each by respective pairs of partitions 12, 14 and 12', 14'. A pair of suction pumps 16, 18, are located in the wings and operated from respective power sources 20, 22. The power sources are shown electrically connected to the pumps, in which case electric energy is supplied to a motor for driving the pumps, but it will be understood that the pumps may be adapted for operation by other suitable driving means. For example, the power source may be the engines of a propellor controlled aircraft, or the pumps may be driven from high pressure air bled from jet engines, in which cases the pumps are operated under mechanical or pneumatic power.

The inlet port of each pump is connected by ducts 24 to the two inner sections of the opposite wing and the outer section of the wing in which the pump is located. Air received through the ducts 24 is pumped out of the aircraft, as through exit ducts 26, 28 leading to the rear of each wing.

Each section of each wing is provided with a plurality of openings 30 in its upper surface (see Fig. 2). For this purpose, the material of the wings may be porous or the wings may be perforated or slotted. In accordance with well known principles, the air adjacent the upper surface of the wing is moved by suction through the openings 30 and it is expelled from the aircraft by the pumps. By this action, the boundary layer adjacent the wing surfaces is prevented from becoming turbulent and drag due to air friction is minimized, a factor of utmost importance in preventing stalling at high speeds. Further, the thickening of the boundary layer at lower speeds, to the point where the main air flow is deflected from the wing surfaces and the aircraft stalls, is greatly delayed. The result is that an aircraft can be flown or landed at much lower speeds than is possible without boundary layer control. A more detailed explanation of boundary layer control is presented in the publication, "Boundary Layer Studies on a Sailplane," by August Raspet, Aeronautical Engineering Review, vol. 11, No. 6, published by Institute of the Aeronautical Sciences, New York 21, N. Y., June 1952.

However, safety requires that boundary layer control be maintained on both wings. If it is available on one wing but not on the other, loss of control of the aircraft may result in loss of the pilot and the aircraft. This condition is obviated by this invention, as will be evident from a consideration of Figs. 1 and 2. By dividing the wings into compartments and controlling the boundary layer on different sections of both wings with independent pumps, failure of one power source or pump will not result in complete loss of boundary layer control over an entire wing.

The arrangement shown in Figs. 1 and 2 is illustrative of the invention, but does not represent a necessary or the best arrangement. It will be apparent that in the event of failure of one pump or its power source, boundary layer control will not be balanced. If only one pump is working, boundary layer control exists only over the surface of the outer section of one wing and the two inner sections of the other wing. Fig. 3 illustrates a more practical arrangement to correct this condition.

Referring to Fig. 3, each wing is divided into four sections, 32, 33, 34, 35 and 32', 33', 34', 35'. Two pumps 16, 36 in one wing respectively control the boundary layer over alternate sections 32, 34 and 33, 35. Similar pumps 18, 38 in the other wing respectively control the boundary layer over alternate sections 32', 34' and 33', 35'. The pumps 16, 18 serving corresponding sections of both wings are operated from one power source 20 and the other power source 22 operates pumps 36, 38. With this arrangement, it will be apparent that on failure of one power source, boundary layer control is still maintained over corresponding sections of both wings, i. e., balanced boundary layer control is retained in the event of failure of one power source.

In the arrangements above described, it will be apparent that in the event of failure of a power source, some boundary layer control will be retained, thereby to maintain a safe condition. To further enhance the safety, it would be desirable to maintain boundary layer over all sections of the wings as long as any power is available. Fig. 4 illustrates an arrangement for this purpose.

Other conventional arrangements to bring standby power sources and pumps into operation will of course be apparent. For the purpose of this invention, it is contemplated that any such arrangement be adapted to maintain boundary layer control over predetermined sections of the wings of an aircraft to avoid total loss of boundary layer control on either wing.

Fig. 4 illustrates a sectional view through a wing 50 and flap 52 therefor. A suction pump 54 draws in air from openings 30' on the wing surface and blows it through a rear slot 56 and over the flap 52. Slot 56 may be of any desired length; it may be coextensive with, or longer or shorter than, flap 52. In common with prior art systems in which air is blown over flaps, the separation of air passing over the flap surface is delayed and makes possible higher angles of attack and lower flight and landing speeds than is possible without boundary layer control.

With the pumping method and system of this invention, the chances of loss of boundary layer control along the entire length of flap 52 are greatly diminished. For example, and referring to Fig. 5, wing 50 may be divided into four sections 60, 62, 64, 66, with flap 52 of sufficient length to span both middle sections 62, 64 and part of the outer and inner sections 60, 66. It will be apparent from the foregoing description of pump arrangements and control that boundary layer control over flap 52 will not be lost entirely, and in fact may be maintained with full effectiveness, in the absence of complete failure of all power sources and pumps.

From the foregoing, it will be apparent that a boundary layer control system has been described in which greater safety of aircraft flight is assured, which is simple in arrangement and highly reliable and effective.

What is claimed is:

Apparatus for providing balanced boundary layer control in hollow airfoils on either side of an axis comprising means parallel to the axis sub-dividing each of the airfoils into a plurality of compartments, those on one side of the axis being substantially equal in respect to volume and spacing from the axis to those on the opposite side, predetermined areas of the active surfaces of the airfoils having a multiplicity of apertures providing communication between said compartments and the external atmosphere, an even plurality of air pumps, duct means providing fluid communication between one of each pair of pumps and one or more compartments of the airfoil on one side of the axis and one or more compartments of the airfoil on the opposite side, means providing fluid communication between the other of each pair of pumps and the remaining compartments, and the duct means for either pump of a pair being so arranged that relatively equal boundary layer capacity on both sides of the axis is served thereby, whereby failure of one pump will still allow substantial boundary layer control distributed equally on both sides of the axis by the remaining pump.

References Cited in the file of this patent

UNITED STATES PATENTS

| 2,377,457 | Stalker | June 5, 1945 |
| 2,449,022 | Stalker | Sept. 7, 1948 |
| 2,514,513 | Price | July 11, 1950 |

FOREIGN PATENTS

| 702,926 | Germany | Feb. 24, 1941 |
| 718,421 | Great Britain | Nov. 17, 1954 |